United States Patent
Morfonios et al.

(10) Patent No.: US 10,248,683 B2
(45) Date of Patent: Apr. 2, 2019

(54) APPLICATIONS OF AUTOMATED DISCOVERY OF TEMPLATE PATTERNS BASED ON RECEIVED REQUESTS

(71) Applicant: Oracle International Corporation, Redwood Shores, CA (US)

(72) Inventors: Konstantinos Morfonios, Dublin, CA (US); Leonidas Galanis, San Jose, CA (US); Kusumaharanadh Poduri, Foster City, CA (US); Jae Young Yoon, San Mateo, CA (US); Zhongtang Cai, Redwood Shores, CA (US); Karl Dias, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 973 days.

(21) Appl. No.: 14/250,343

(22) Filed: Apr. 10, 2014

(65) Prior Publication Data

US 2015/0293964 A1 Oct. 15, 2015

(51) Int. Cl.
*G06F 7/00* (2006.01)
*G06F 17/30* (2006.01)
(Continued)

(52) U.S. Cl.
CPC .... *G06F 17/30371* (2013.01); *G06F 11/3409* (2013.01); *G06N 7/005* (2013.01);
(Continued)

(58) Field of Classification Search
CPC ......... G06F 17/30321; G06F 17/30371; G06F 17/30991; G06F 17/30469
(Continued)

(56) References Cited

U.S. PATENT DOCUMENTS 5,960,436 A  9/1999  Chang et al.
5,977,890 A  11/1999  Rigoutsos et al.
(Continued)

OTHER PUBLICATIONS

Yujun Wang et al., "Real Application Testing with Database Relay", 2009, 6 pages.
(Continued)

*Primary Examiner* — James Trujillo
*Assistant Examiner* — John J Morris
(74) *Attorney, Agent, or Firm* — Invoke

(57) ABSTRACT

Techniques for leveraging frequent patterns identified in a captured workload are provided. In one approach, multiple frequent patterns detected in a captured workload may be ordered by frequency to determine, for example, which patterns should be targeted for optimization. In another approach, a model of a captured workload is created, where the model comprises nodes that represent templates (which in turn correspond to requests) and edges that represent transitions between templates. The model is used to create an artificial workload, such as a workload that is twice as large as the originally-captured workload. The model may also be edited before creating the artificial workload. In another approach, workload models are compared to identify errors, regressions, or security issues. In another approach, an artificial workload is created for an application that is not yet deployed and then executed to determine whether the artificial workload or the originally-captured workload executed faster.

20 Claims, 5 Drawing Sheets

(51) Int. Cl.
*H04L 12/26* (2006.01)
*G06F 11/34* (2006.01)
*G06N 7/00* (2006.01)

(52) U.S. Cl.
CPC .......... *H04L 43/04* (2013.01); *H04L 43/0817* (2013.01); *G06F 11/3452* (2013.01); *G06F 2201/80* (2013.01); *G06F 2201/875* (2013.01)

(58) Field of Classification Search
USPC ........................................................ 707/753
See application file for complete search history.

(56) References Cited

U.S. PATENT DOCUMENTS

| | | | |
|---|---|---|---|
| 6,094,684 | A | 7/2000 | Pallmann |
| 6,253,228 | B1 | 6/2001 | Ferris et al. |
| 7,426,513 | B2 | 9/2008 | Gvily |
| 7,512,877 | B2 | 3/2009 | Aoki |
| 7,519,527 | B2 | 4/2009 | Lau et al. |
| 7,818,746 | B2 | 10/2010 | Anderson |
| 7,890,458 | B2 | 2/2011 | Dias et al. |
| 8,024,299 | B2 | 9/2011 | Dias et al. |
| 8,336,054 | B2 | 12/2012 | Cherkasova et al. |
| 8,352,240 | B2 | 1/2013 | Ling et al. |
| 8,370,386 | B1* | 2/2013 | Wang ............... G06F 17/30991 707/778 |
| 8,442,941 | B2 | 5/2013 | Yao et al. |
| 8,510,406 | B2 | 8/2013 | Kembel et al. |
| 8,516,361 | B2 | 8/2013 | Tatsubori et al. |
| 2001/0020237 | A1 | 9/2001 | Yarnall et al. |
| 2002/0103858 | A1 | 8/2002 | Bracewell et al. |
| 2002/0198984 | A1 | 12/2002 | Goldstein et al. |
| 2003/0061569 | A1 | 3/2003 | Aoki |
| 2003/0172091 | A1 | 9/2003 | Norcott |
| 2004/0003266 | A1 | 1/2004 | Moshir et al. |
| 2004/0015600 | A1 | 1/2004 | Tiwary et al. |
| 2004/0153430 | A1* | 8/2004 | Sayad ............... G06F 17/30598 706/61 |
| 2004/0221115 | A1 | 11/2004 | Sahin et al. |
| 2005/0071838 | A1 | 3/2005 | Hatasaki |
| 2005/0131879 | A1 | 6/2005 | Ghosh et al. |
| 2005/0186975 | A1 | 8/2005 | Yach et al. |
| 2006/0041685 | A1 | 2/2006 | Bracewell et al. |
| 2006/0248116 | A1 | 11/2006 | Sobel |
| 2007/0033586 | A1 | 2/2007 | Hirsave et al. |
| 2007/0112549 | A1 | 5/2007 | Lau et al. |
| 2007/0277108 | A1 | 11/2007 | Orgill et al. |
| 2008/0022282 | A1 | 1/2008 | Cherkasova et al. |
| 2008/0097960 | A1 | 4/2008 | Dias et al. |
| 2008/0097961 | A1 | 4/2008 | Dias et al. |
| 2008/0097995 | A1 | 4/2008 | Dias et al. |
| 2008/0097996 | A1 | 4/2008 | Dias et al. |
| 2008/0098003 | A1 | 4/2008 | Dias et al. |
| 2009/0106321 | A1* | 4/2009 | Das ................... G06F 17/30469 |
| 2009/0319256 | A1 | 12/2009 | Chow et al. |
| 2010/0005097 | A1 | 1/2010 | Liang et al. |
| 2010/0299176 | A1 | 11/2010 | Manglpudi et al. |
| 2011/0295801 | A1 | 12/2011 | Dias et al. |
| 2012/0005174 | A1 | 1/2012 | Vora |
| 2012/0109936 | A1* | 5/2012 | Zhang ............... G06F 17/30312 707/713 |
| 2012/0158723 | A1 | 6/2012 | Wu et al. |
| 2012/0185430 | A1 | 7/2012 | Yao et al. |
| 2013/0191723 | A1 | 7/2013 | Pappas et al. |
| 2013/0311642 | A1 | 11/2013 | Morfonios |
| 2013/0325829 | A1* | 12/2013 | Agarwal ........... G06F 17/30008 707/703 |
| 2014/0006358 | A1 | 1/2014 | Wang et al. |
| 2014/0244643 | A1* | 8/2014 | Basak ................ G06F 17/3071 707/737 |

OTHER PUBLICATIONS

Inderpal S. Johal, "Oracle 11g Database Relay", 2007, 38 pages.
Leonidas Galanis et al., "Oracle Database Replay", dated 2008, 12 pages.
Rajeev, "Consolidated database replay", dbaStreet, Dated May 23, 2012, 2 pages, accessed online at <http://dbastreet.com/blog/?tag=database-replay> on Nov. 5, 2013.
Colle et al., "Oracle Database Replay," ACM, 2009 (4 pages).
"Database Replay", Oracle White Paper, 2007 (19 pages).
Ayan, Resat Otan. "Methodologically Upgrading a Production System". SANS Institute, InfoSec Reading Room [online] [retrieved on Dec. 16, 2008]. Retrieved from the Internet < URL: https://www2.sans.org/reading_room/whitepapers/sysadmin/1097.php > dated 2003 (15 pages).
"Big4Guy". IT Environment Instances: Test Development Patch Production. [online], [retrieved on Dec. 16, 2008]. Retrieved from the Internet < URL: http://big4guy.com/index.php/2006/09/22/it_environment_instances_test_develpmen > dated 2006 (3 pages).
Chan, J. "Creating a Testing Environment for Hotfixes and Patches". Ask the Enterprise Desktop Expert: Questions & Answers [online], [retrieved on Dec. 16, 2008]. Retrieved from the Internet < URL: http://searchenterprisedesktop.techtarget.com/expert/KnowledgebaseAnswer/0,289625,sid192_gcil 123515.,00.html# > dated 2008 (3 pages).
Holcomb, J. "Virtualization in the SCADA World: Part 3—Testing", SCANApedia [online], [retrieved on Dec. 16, 2008]. Retrieved from the Internet < URL: http://www.digitalbond.com/index.php/2008/02/07/virtualization-in-the-scada-world-part-3 / >. dated 2008 (3 pages).
VMware. "VMware P2V Assistant", Enterprise-class Tool for Physical to Virtual Machine Migration [online], [retrieved on Dec. 16, 2008]. Retrieved from the Internet < URL: http://www.nexstor.co.uk/prod_pdfs/VMware%20P2V%20Assistant.pdf > dated 2003 (2 pages).
Wise Solutions. Wise Package Studio 7: Professional Edition. [online], [retrieved on Dec. 16, 2008]. Retrieved from the Internet < URL: http://www.componentsource.com/products/wise-package-studio-professional/index.html > dated 2008 (2 pages).

* cited by examiner

APPLICATIONS OF AUTOMATED DISCOVERY OF TEMPLATE PATTERNS BASED ON RECEIVED REQUESTS

CROSS-REFERENCE TO RELATED APPLICATIONS

This application is related to U.S. patent application Ser. No. 13/475,514, filed May 18, 2012, the entire contents of which are hereby incorporated by reference for all purposes as if fully set forth herein.

FIELD OF THE DISCLOSURE

The present disclosure relates to analyzing captured workloads, generating models of captured workloads, and generating artificial workloads.

BACKGROUND

Administrators of many types of servers, including web servers and database servers, have access to vast amounts of data specifying the requests that are received by the server. A captured database workload is one example of such data possessed by a database server. A captured database workload file records requests received by a particular database through an open connection during a particular interval of time. If there are multiple open connections to the database during capture, then the result may be multiple capture files, one file for each open connection. The requests received by the server are often automated and sent by a plurality of different application servers. Similarly, a captured application workload file records requests received by an application through an open connection during a particular interval of time.

Captured database workload files are described in greater detail in application Ser. No. 11/800,122, entitled Database Workload Capture And Replay Architecture, filed on May 3, 2007, the contents of which are incorporated by reference. Captured application workload files are described in greater detail in application Ser. No. 13/076,313, entitled Application Workload Capture And Replay System, filed on Mar. 30, 2011.

Server administrators and application administrators can benefit by learning about the types of requests the server receives and the consequences of those requests. Previous approaches have not used information about the requests received by a server to determine patterns that can provide insight about the received requests and the consequences of the received requests.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
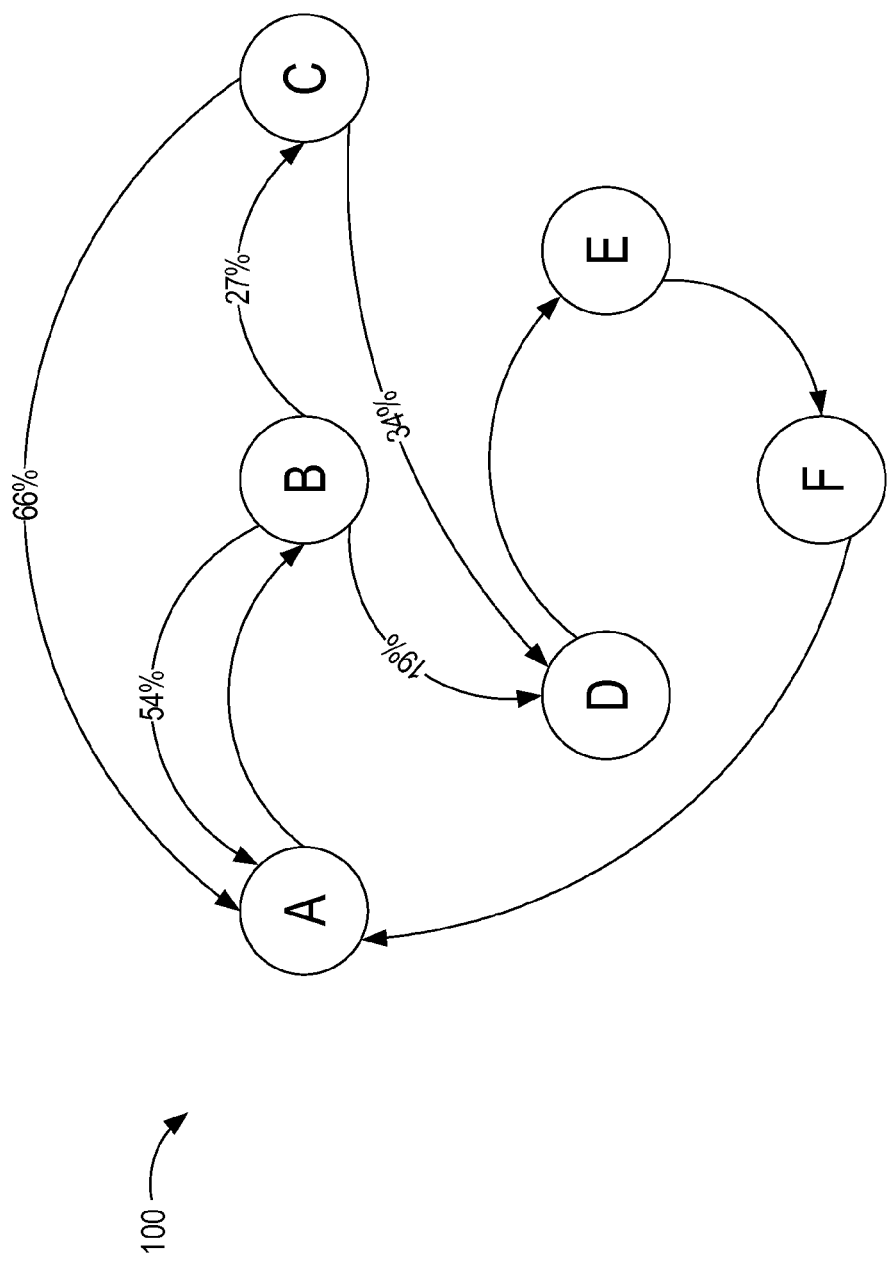
FIG. 1 is a block diagram that depicts a graph of an example workload model, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Detecting Patterns in a Captured Workload

U.S. patent application Ser. No. 13/475,514, incorporated by reference above, describes how patterns of requests in a captured workload may be detected. Examples of requests in a captured workload include application requests that are generated in response to user input interacting with an application, database server requests generated by an application (e.g., in response to user input), and database calls that a database server generates in response to executing execution plans generated for database server requests. Example application requests include HTTP requests, such as GET and POST. Example database server requests include SQL statements, such as INSERT, UPDATE, and SELECT. Example database calls include PREPARE, EXECUTE, and FETCH. The foregoing are examples of types of requests that are initiated in a multi-tier system. Embodiments are not limited to these examples.

A captured workload may be reflected in one or more log files that store the requests. Each log file may correspond to one or more (e.g., user or database) sessions and may include timing information and/or resource utilization information. Example timing information may be when each request was received or how long it took to process the request. The timing information may be used to determine a period of time between requests. Example resource utilization information may include how much of a CPU was required to process a request, how much memory was required to process a request, and/or how much network bandwidth was utilized to process a request.

As described in U.S. patent application Ser. No. 13/475,514, a captured workload is analyzed to identify one or more patterns.

Patterns may be identified by first normalizing each request to remove data, such as constants, bind variables, predicates, and/or selected columns and create templates. For example, even though two SQL statements that target the same set of one or more tables have different predicates and select different columns, the two SQL statements may be normalized to create different instances of the same template.

After templates are created, each template may be mapped to a different template identifier. Then, template identifiers may be ordered to match the order of the requests that correspond to the template identifies (as reflected in the captured workload). Once the template identifiers are ordered, patterns of template identifiers are detected.

General Overview

Detected patterns of template identifiers (or simply "patterns") may be used in multiple ways. In one approach, patterns may be ordered by one or more workload criteria. A workload criterion is any criterion associated with a workload that may be used to order a pattern. Examples of workload criteria include frequency or execution time. For example, the number of times each pattern occurs in a workload is used to order the patterns relative to each other. Ordered patterns may be used to determine which patterns are most important and, thus, more time and attention should be devoted to optimizing the corresponding requests.

In another approach, a workload model is generated based on the detected patterns. A workload model represents the corresponding captured workload. A workload model may be used to create artificial workloads, such as workloads that are twice as large as the original captured workload. Furthermore, a workload model may be modified or edited in order to generate an artificial workload that reflects a different type of workload.

In another approach, patterns are analyzed to determine whether to cache certain results.

In another approach, a query optimizer uses patterns as input to generate more efficient execution plans.

Ordering Patterns

In an embodiment, the frequency of each of multiple template patterns identified in a workload is used to order or rank the template patterns. For example, if template pattern A is identified 33 times, template pattern B is identified 87 times, and template pattern C is identified 59 times, then the template patterns may be ordered as follows: B, C, and A.

Not all template patterns need to be displayed. For example, only the top five template patterns in terms of frequency are displayed to a user. A user may use the frequency information to determine which template patterns are candidates for optimizing. If the template patterns that occur most frequently in a workload are optimized, then similar workloads in the future may be processed significantly faster.

In a related embodiment, template patterns are ordered based on other factors, such as how long (e.g., on average) each pattern typically takes to fully process and how much (e.g., average) CPU, memory, disk I/O, and/or network I/O is required to process each pattern. Time or resource utilization data may be modified to remove outliers. For example, if an instance of one pattern in an original workload takes thirty minutes to complete but all other instances of the pattern in the original workload take under three minutes to complete, then the thirty minute data may not be reflected in an average time or median time that is used to order the corresponding template pattern.

Workload Model

In an embodiment, a captured workload is analyzed to generate a graph that models the original workload. An "original" or "real" captured workload is one that is based on actual queries and updates submitted by real users in a production environment. A captured workload that is generated based at least partially on queries and updates that were not submitted in a production environment is considered an "artificial" captured workload. For example, an artificial captured workload may be based on requests submitted in a testing environment and/or generated by automated tools.

A workload model may be based on all template patterns that are identified by analyzing a captured workload (whether real or artificial). Alternatively, a workload model may be based on a subset of all the template patterns that are identified, such as the top five most frequent patterns, or the top ten template patterns that are the most computationally expensive.

Nodes of a graph represent templates. Directed edges that connect nodes in the graph represent transitions from one node to another node. An edge connects a "source" node to a "target" node. A target node is preceded by one or more source nodes. Similarly, a source node is succeeded by one or more target nodes.

Edges may be marked with a probability that indicates the probability of the corresponding transition. The probability for a transition from template A to template B may be calculated by dividing (1) the total number of times the transition was made in an actual workload by (2) the total number of instances of template A in the actual workload.

FIG. 1 is a block diagram that depicts a graph 100 of an example workload model, in an embodiment. Graph 100 is based on an original workload, in which three patterns were detected in a captured workload. The captured workload may reflect a sequence of templates as follows:

ABCABCABDEFABABABCDEFAB . . . .

Given the sequence, graph 100 is generated. In a subsequent step, the following patterns are identified: (1) A, B, C; (2) A, B; and (3) D, E, F, A, B. Thus, graph 100 includes six nodes (A-F) and nine directed edges. Node A is considered a target node with respect to three edges and is considered a source node for one edge.

In other words, a graph is generated by identifying a sequence of templates. Common template patterns are then identified from the graph. Template patterns that are discovered but that are considered "uncommon" may be excluded from the graph. For example, template pattern D, G may have been detected in the original workload associated with graph 100. However, due to that pattern's relative infrequency or small "footprint" in the original workload, pattern D, G is not reflected in graph 100.

Some of the edges between nodes in graph 100 include a percentage that reflects a probability that, given the source side of the edge, the target side of the edge will be next. For example, at node B, there is a 54% probability that the next node will be node A and a 27% probability that the next node will instead be node C. One or more edges in graph 100 do not include a percentage, which may reflect that the target node of an edge is the only target node for a particular source node.

In an embodiment, an edge in a graph is associated transition time data that indicates how much time between issuance of a request associated with a source node of the edge and issuance of a request associated with a target node of the edge. Additionally or alternatively, a node in a graph is associated with execution time data that indicates how long (or how many resources) it took to process a corresponding request. Both types of time data may be averages or histograms that describe the distribution of execution time for a given node or transition time for a given edge. Both types of time data may be stored in the graph or, for example, in one or more base files that store, collectively, the requests of the original workload. With the time data, an artificial workload may be generated that more accurately reflects how quickly each artificial request is to be submitted or processed.

Artificial Workload

A random walk of a graph is performed to generate an artificial workload. A random walk begins by selecting a node in the graph and then selecting the next node based on the "transition" likelihood (or percentage) associated with each edge that extends from the root node. For example, if a root node is associated with three edges and the percentages are 12%, 56%, and 32%, then one of the three edges is selected based on those percentages. Thus, there is a 12% chance that the first edge is selected, a 56% chance that the second edge is selected, and a 32% chance that the third edge is selected. Each subsequent node that is traversed during the random walk involves a similar selection. In this way, an artificial workload that fits into the original model may be generated.

The first node to select may be a random node in the graph, the node that corresponds to the first request in the original workload, or a random node that is also the first node in a template pattern that was discovered in the original workload.

In an embodiment, a workload model comprises a series of template patterns, none of which are connected to another template pattern (unlike graph 100). However, each template pattern is associated with a ranking or a frequency. For example, given the example patterns above for graph 100, the first template pattern (i.e., A, B, C) is associated with 63%, the second template pattern (i.e., A, B) is associated with 28%, and the third template pattern (i.e., D, E, F, A, B) is associated with 9%. An artificial workload may then be generated by (a) randomly selecting, based on the respective percentages, one of the template patterns and (b) generating an artificial workload for the selected template pattern, and then repeating (a) and (b) a certain number of times. Generating an artificial workload also involves selecting data values for templates that represent data requests and for templates that represent data updates (e.g., insertions, deletions, or modifications). For example, insert statements may specify a table and a source of rows to be inserted into the table. If a column of the table has default values or is nullable, then values for such columns do not need to be specified. For example, update statements may specify a table, a column of the table, a predicate on the column, and one or more values that are to replace existing values in the column. The predicate may be on any combination of columns and not necessarily on the column to be updated.

How the data values for an artificial workload (referred to herein as "artificial data values") are determined may vary from implementation to implementation. For example, the data values may be taken from the original workload (referred to herein as "original data values"). If an artificial workload is the same size or smaller than its corresponding original workload, then the original data values may be used. Also, the original data values may be repeated if the artificial workload is larger than the original workload.

In other cases, if an artificial workload is larger than the original workload or the original data values are not available, then artificial data values need to be generated. In an embodiment, artificial data values may simply be repeats of original data values. However, column constraints (e.g., a unique constraint) may need to be considered when repeating original data values.

In an alternative embodiment, artificial data values may be manually specified, which may be referred to as "data banking."

In an alternative embodiment, artificial data values are automatically determined, without copying original data values. In order to automatically generate artificial data values, original data values may be analyzed to detect data value patterns. For example, an original workload may include multiple instances of five inserts of unique data values followed by a single query for the inserted data values. Therefore, artificial data values for the corresponding template pattern may have the same constraints, i.e., that five inserts are of unique data values followed by a single query that requests the inserted data values.

In a related embodiment, constraints on columns of tables are considered when determining artificial data values. Examples of constraints are data type (e.g., String, Date, Number), unique constraint, range constraint (e.g., between 01-01-2014 and 12-31-2014), maximum value constraint, and minimum value constraint. Once constraints of a column are identified, then one or more artificial data values that are to be inserted into the column may be generated.

In a related embodiment, the distribution of the original data values is considered when determining artificial data values. For example, in a column named Salary, 20% of the original data values may be in the range $10,001-$20,000, 25% of the original data values may be in the range $20,001-$30,000, 50% of the original data values may be in the range $30,001-40,000, and 5% of the original data values may be larger than $40,000. Thus, the same distribution may be maintained for artificial data values that are generated.

In a related embodiment, correlations among original data values are determined. For example, there might be a correlation that the same customer always visits a store branch in the same zip code where the customer also lives.

In an embodiment, actual queries in an original workload are analyzed to determine their respective selectivities. A highly selective query is one that selects or returns relatively few rows from a table or column, such as less than 1%. A low selective query is one that selects or returns relatively many rows from a table or column, such as greater than 15%.

If an actual column cannot be used when running an artificial workload, then an artificial column needs to be created and populated. In an embodiment, data value distribution of the actual column (or at least constraints on the column) is considered when determining what artificial data values to use to populate an artificial column.

In a related embodiment, some data values for an artificial workload are automatically generated while other data values for the artificial workload are manually specified.

Scaling a Workload

In an embodiment, a user specifies how large an artificial workload is to be relative to the original workload upon which a workload model is based. For example, a user may specify a scale-up factor of two, which causes an artificial workload to be twice as large as the original workload upon which the model is based. A scale-up factor that is greater than one indicates that an artificial workload will be larger than the original workload. Conversely, a scale-up factor that is less than one indicates that an artificial workload will be smaller than the original workload. Experimenting with different scale-up factors can be useful for capacity planning, stress testing, or other applications.

In a related embodiment, a user may specify a scale-up factor for a single template pattern. For example, if a workload model comprises four template patterns (P1, P2, P3, and P4), then a user may specify a scale-up factor of three for P1, a scale-up factor of 0.8 for P2, a scale-up factor of one for P3, and a scale-up factor of 1.5 for P4. A resulting artificial workload will be different from the original workload in that: (1) P1 will be represented about three times as often relative to its occurrence in the original workload; (2) P2 will be represented about 80% as often relative to its occurrence in the original workload; (3) P3 will be represented about as often relative to its occurrence in the original workload; and (4) P4 will be represented about one and a half as often relative to its occurrence in the original workload.

A scale-up factor may indicate that the requests of an artificial workload are to be submitted in the same window of time as requests in the original workload. For example, if the original workload involved server requests that were submitted over a two hour window, then the server requests in the artificial workload (regardless of its size relative to the original workload) are to be submitted to a database server over a two hour period. In other words, this is a scale up through an increase of the request rate.

Alternatively, the scale-up factor may indicate that the requests of an artificial workload are to be submitted over a time window that is based on the size of the artificial workload relative to the original workload. For example, if the original workload involved server requests that were submitted over a two hour window and the scale up factor is two, then the artificial workload will be about twice as large as the original workload but the server requests of the artificial workload will be submitted over a four hour window.

Thus, in an embodiment, a user may specify two parameters: (1) a size scale parameter that indicates how "big" (i.e., in terms of number of requests) an artificial workload is to be relative to the size of the corresponding original workload and (2) a time scale parameter that indicates how quickly the server requests of an artificial workload are to be submitted relative to the "speed" of the corresponding original workload. For example, a time scale parameter of two may indicate that service requests from an artificial workload are to be submitted twice as fast as server requests in the original workload. Thus, concurrency of the server requests may increase. Similarly, a scale-up factor of 0.4 in terms of time may indicate that service requests from an artificial workload are to be submitted to a database server at 40% of the (e.g., average) rate that service requests in the original workload were submitted.

In a related embodiment, a user is able to specify a scale-up factor for the number of concurrent sessions for an artificial workload. For example, an original workload may have had an average of 93 concurrent sessions. A scale-up factor of 1.3 for an artificial workload may indicate that the average number of concurrent sessions in the artificial workload should be about ceiling(93*1.3)=121. The user may also be able to specify a standard deviation or variance value that indicates how much the concurrent session value may deviate from the average.

Editing a Workload

In an embodiment, a workload model is editable. Example edits include:
 changing one or more probabilities of transitions in a graph;
 removing transitions from a graph, such as relatively infrequent transitions, an example of which is a transition of under 5%;
 adding transitions to existing nodes in a graph;
 removing nodes from a graph;
 adding nodes to a graph; and
 removing one or more entire node sequences that correspond to one or more template patterns, such as those that only occur a certain number of times or are considered infrequent relative to other template patterns.

An edit to a workload model may occur automatically in response to one or more criteria being satisfied. For example, if a transition is under 5%, then the transition is automatically removed.

Additionally or alternatively, an edit to a workload model may occur in response to user input. In this way, a user is able to tailor the user's testing workloads according to their needs. For example, a user may specify one or more applications that are sources of server requests. Any template patterns that originate from the one or more applications are removed from the workload model. Alternatively, the one or more applications may be specified at a capture phase or post-capture phase before a workload model is first generated based on one or more capture files that include information about an original workload. Any server requests from the specified application(s) will not be reflected in the workload model when the workload model is first generated.

Results Cache

A database server may use a result cache to store results of previous requests that might be useful for requests in the future. One benefit of this approach is that the database server does not have to retrieve the same information from expensive storage if the information is already stored in the result cache. A cache is generally volatile memory, such as RAM, that is faster to access than non-volatile memory, such as an optical or magnetic disk.

In an embodiment, a workload model is used to increase efficiency of the result cache. For example, a workload model may be used to determine a sequence of one or more requests that typically follow a particular request. The sequence of one or more requests is analyzed to determine whether information related to the particular request should be cached in the results cache.

However, the information from processing requests may not be relevant for subsequent requests. Thus, the templates that correspond to nodes may be analyzed to determine whether results from an "upstream" request (which is a request that comes before a subsequent request) may be relevant to a "downstream" request (which is a request that comes after a previous request). For example, if two requests specify the same column, then results of the first request are stored in the results cache and may be used when processing the second request. As another example, if two requests involve a join of two tables even though the requests select different columns, then results of the first request are stored in the results cache and may be used when processing the second request.

In a related embodiment, a combined probability for two or more transitions is calculated and used to determine whether to store information in a results cache. For example, if a possible node sequence in a workload model is A, B, C and the transition from node A to node B is 70% and the transition from node B to node C is 80%, the probability of eventually arriving at node C from node A is 56%. Therefore, the results of processing a request that corresponds to node A will be cached for a request that corresponds to node B. However, the result cache is not guaranteed to store the results of processing node A after the request corresponding to node B is processed because 56% is less than a, for example, 60% minimum threshold.

Figure 2:
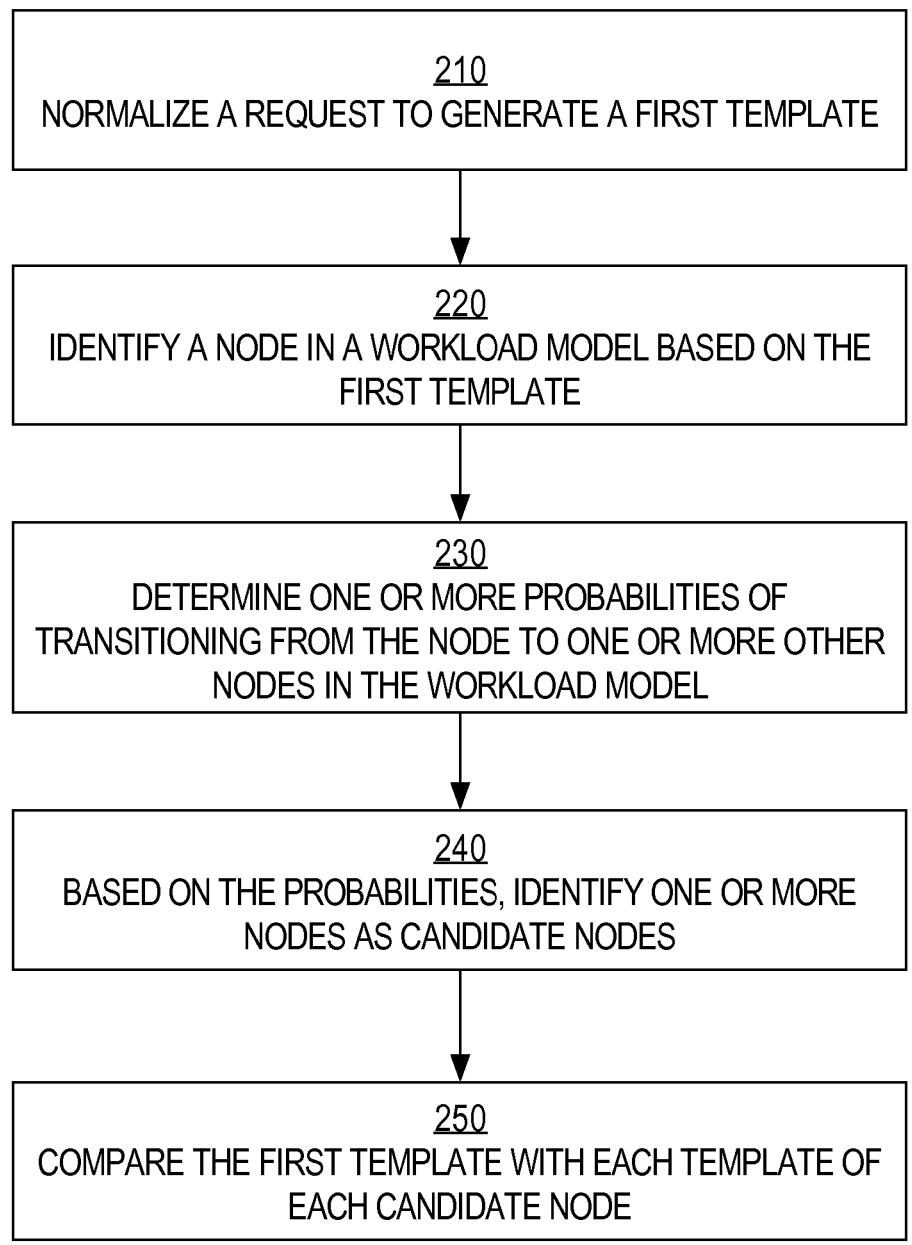
FIG. 2 is a flow diagram that depicts a process for using a workload model to determine whether to cache results generated by processing a request, in an embodiment.

FIG. 2 is a flow diagram that depicts a process 200 for determining whether to cache results of processing a request, in an embodiment.

At block 210, the request is normalized to generate a first template. Request normalizing is the process of reducing a request to a canonical or normal form. Normalizing a request typically involves removing one or more characters or words from a request. For example, a request may be a SQL SELECT statement that removes the SELECT and WHERE clauses and retains the object (e.g., table or materialized view) names in the FROM clause.

At block 220, the first template is used to identify a node in a workload model. Block 220 may involve determining a template identifier for the first template based on a mapping of templates to the templates' respective template identifiers. Each node in the workload model may correspond to a different template identifier. Alternatively, each node in the workload model may include the template itself, instead of the template identifier.

At block 230, one or more probabilities of transitioning from the node to one or more other nodes in the workload model are determined. For example, node A in a workload model is identified in block 220. Node A is connected to node B by an edge that is associated with a probability of 80%. If node A is directly connected to multiple nodes through different edges, then the probability of each edge is considered.

Block 230 may also consider nodes that are not directly connected to the node identified in block 220. For example, if node A is connected to node B and node B is connected to node C, then the probability of transitioning from node A to node C is determined. The probability may be calculated by multiplying (1) the probability of transitioning from node A to node B by (2) the probability of transitioning from node B to node C.

At block 240, based on the one or more probabilities, one or more nodes are identified as candidate nodes. For example, if a probability of transitioning from the identified node in block 220 to another node is greater than a particular threshold (e.g., 65%), then the other node is identified as a candidate node. In the example above, node B may be identified as a candidate node (relative to node A) because 80% is above the particular threshold. Block 240 may involve identifying multiple nodes.

At block 250, the first template (of the node identified in block 220) is compared to each template of each candidate node. If the templates are the same or sufficiently similar, then the results of the request (normalized in block 210) are cached. For example, sufficiently similar templates may be ones that access the same data or target the same table or sets of tables, even if the templates involve different selected columns. As another example, sufficiently similar templates may be ones that have similar subqueries, such as subqueries that appear in WITH clauses.

Although process 200 is depicted as occurring in a particular order, the order may be different in other embodiments. For example, before block 230 is performed, candidate nodes are first identified by comparing the first template (generated in block 210) with other templates of nodes in the workload model. After the candidate nodes are identified, then a probability of transitioning from the node (identified in block 220) to each candidate node is determined. If the probabilities are higher than particular threshold, then the results of the request (normalized in block 210) are stored.

Hints for Optimizations

In an embodiment, a workload model is used to improve a query optimizer. The query optimizer uses the workload model to predict future requests (e.g., based on one or more probabilities) and, as a result, generate an execution plan for a request, where the execution plan optimizes a group of requests instead of just a single request.

For example, a first node in a workload model corresponds to a first template that involves processing data from a particular table. A second node (whether directly connected to the first node or indirectly connected to the first node) in the workload model corresponds to a second template (or the first template, in which case the first node transitions to itself) that also involves processing data from the particular table. Without this information, an optimizer may determine that processing a first request that corresponds to the first node should use an index to process the first request rather than performing a scan of the particular table. With the workload model information, the optimizer may determine that processing a second request (that has not yet been received or even submitted) that corresponds to the second node (or the first node) may use the scanned data blocks of the particular table. Thus, when processing the first request, the optimizer may instead determine that the particular table should be scanned, after which the scanned data blocks are available in memory for the second request (which may be likely to come). Thus, if the second request is processed, then the particular table will not have to be read from relatively slow data storage (such as a magnetic disk).

As a similar example to the example above, an optimizer may determine (without a workload model) that processing a first request that corresponds to the first node should involve scanning the particular index rather than using an index on the particular table. With the workload model, the optimizer may determine that processing a second request (that has not yet been received or even submitted) that corresponds to the second node (or the first node) may use the index. Thus, when processing the first request, the optimizer may instead determine that the index should be used, after which the index (or relevant portions thereof) is available in memory for the second request (which may be likely to come). Thus, if the second request is processed, then the index will not have to be read in again from relatively slow data storage.

As another example, a first node in a workload model corresponds to a first template that involves selecting a first column from a particular table. A subsequent node (whether directly connected to the first node or indirectly connected to the first node) in the workload model corresponds to a second template that involves selecting the first column and a second column from the particular table. Without the workload model, an optimizer may determine that a first index that is on the first column should be used to process a first request that corresponds to the first node in the workload model. With the workload model, an optimizer may determine that a second index (that is a composite index on the first and second columns) should be used to process the first request because a second request (which is relatively likely to be processed soon after the first request) corresponds to the second node in the workload model. Thus, the second index may be read once and used to process both the first request and the second request (if the second request is indeed submitted) instead of having to read the first index and the second index separately.

As another example, if a particular query is part of a sequence of requests and there exists a prior request that has loaded data that the particular query needs into memory with relatively high likelihood, then a query optimizer may decide to generate cost estimates for candidate execution plans differently given the fact that there is a relatively high probability that some of the needed data is already in the cache. Thus, the query optimizer may select a different execution plan with the pattern information than the query optimizer would have without the pattern information.

Figure 3:
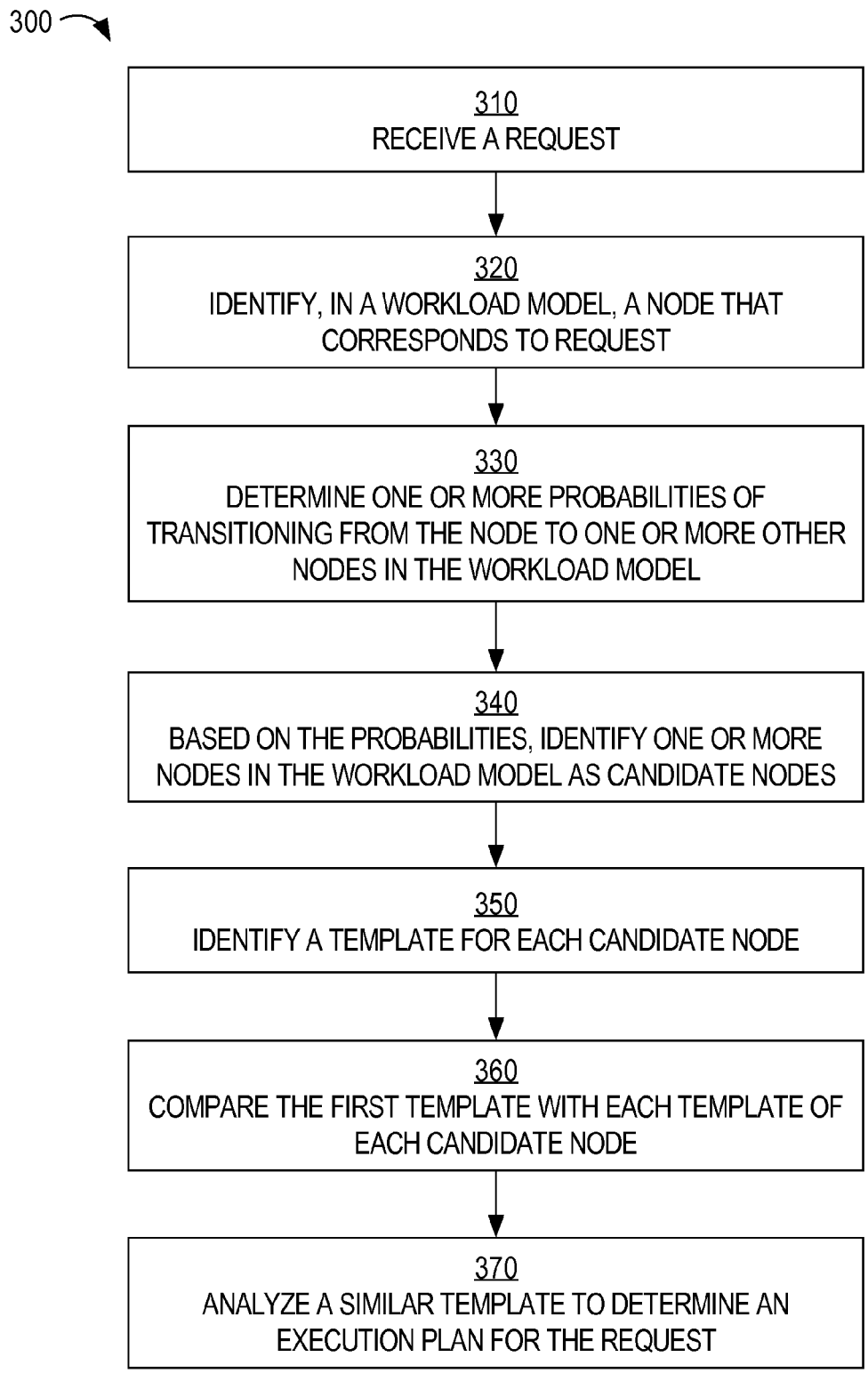
FIG. 3 is a flow diagram that depicts a process for using a workload model to optimize processing of requests, in an embodiment.

FIG. 3 is a flow diagram that depicts a process 300 for optimizing the processing of requests, in an embodiment.

At block 310, a request is received. A request may be an HTTP request or a database request, such as a SQL statement.

At block 320, in response to receiving the request, an optimizer identifies a particular node, in a workload model, that corresponds to the request. Block 320 may involve the optimizer (or another component of a query engine) normalizing the request to generate a template and then comparing the template to one or more other templates in the workload model to identify a matching template and the particular node for that matching template.

At block 330, the optimizer determines one or more probabilities of transitioning from the particular node to one or more other nodes in the workload model. Block 330 may be similar to block 230, described previously.

At block 340, the optimizer identifies, based on the one or more probabilities, one or more nodes that are subsequent to the particular node. The one or more subsequent nodes may be the particular node (if the particular node points to itself in the workload model or is involved in a cycle) or different nodes that are connected directly or indirectly to the particular node. Each of the one or more subsequent nodes is identified based on the probability that a subsequent request that corresponds to the subsequent node will be received after receiving a request that corresponds to the particular node. For example, a 50% probability threshold may be used. Thus, if the probability of receiving a subsequent request that corresponds to a subsequent node (after receiving the particular node) is greater than 50%, then the optimizer considers the subsequent node when optimizing the particular request.

In an embodiment, an optimizer maintains information about one or more previous requests relative to a current request to determine which subsequent nodes in a workload model to analyze. For example, a workload model may include a first template pattern of A, B, C and a second template of B, D. Thus, if a current request corresponds to template B and an optimizer does not maintain information about previous requests, then the optimizer does not know which template pattern is more relevant to the current request. However, if the optimizer stores previous request data that indicates that the previous request immediately prior to the current request corresponds to template A, then the optimizer determines that the first template pattern is more relevant and therefore considers template C when optimizing the current request (which corresponds to template B).

At block 350, a template for each of the candidate nodes is identified. For example, each node in a workload model may indicate a template identifier, which may be used to look up a corresponding template based on a mapping of template identifiers to their respective templates.

At block 360, the template for the particular node is compared to each template identified in block 350.

At block 370, if a template of a candidate node is the same or sufficiently similar to a template of the node identified in block 320, then the template of the candidate node is analyzed by the optimizer to determine an execution plan for the request (received in block 310). For example, as noted above, a similar template may be used to determine that an index should be used to process the request when the optimizer would have determined to use a table scan without that information.

Generation of Application Data Model

In some applications, no constraints are defined in the database for performance reasons. But knowing the missing constraints and the related data dependencies may be very important for applications such as data subsetting or artificial data generation. By analyzing the way bind data flows in discovered patterns, having a workload model may be able to help automate the generation of the missing constraints.

For example, the following frequent pattern is discovered in a captured workload: Q1, I1, I2, I3, where Q1 is a query, I1-I3 are inserts into different tables, and data associated with the inserts I1-I3 appear as bind values. Based on this discovered pattern, the corresponding requests in the captured workload are analyzed to determine that: (1) I1 has a primary key, which appears as a bind in I1; (2) the same key is inserted in I2 and I3; and (3) the key is not part of the primary key in the tables of I2 and I3. Based on this information, it can be deduced that I2 and I3 have implicit foreign key constraints with the table referred to in I1. Such constraints, if not in the database, may be defined by an application data model. The existence of such constraints can be reverse engineered with confidence by looking at the captured workload for frequent flows and doing some bind analysis on those flows. After this analysis, it is automatically recommended that these constraints be defined in the database.

Comparing Workload Models

In an embodiment, two workload models are compared. Comparing two workload models may be performed by comparing the most frequent template patterns of one workload model with the most frequent template patterns of another workload model. For example, the template pattern of A, B, C, D may be the most frequent template pattern in a first workload model but the third most frequent template pattern in a second workload model. Thus, the template pattern may be identified to a user (such as a database administrator) who may use this information to make one or more decisions.

Comparing two workload models may be performed in one of multiple ways. For example, movement in the order of each frequent pattern in one workload model relative to another workload model is tracked. For example, if template pattern A, B, C is the most frequent in a first workload model and the fourth most frequent in a second workload model, then such a change amounts to three points. A template pattern that exists in one workload model but not in another may amount to five points. The total points may then be used to reflect how different one workload model is from another workload model. Thus, the less points that are counted during a comparison, the more the two workload models (and their corresponding workloads) are similar. Conversely, the more total points that are counted during a comparison, the more the two workload models are dissimilar.

Two workload models that are compared may be different in one or more ways, one of which may be time. For example, a first workload model may represent a workload on a database server in November while a second workload model may represent a workload on the database server in December.

Two workload models (for the same application) that are compared may be different in terms of geography. For example, a first workload model may represent a workload based on users in Germany during one period of time while a second workload model may represent a workload based on users in the United States during the same (or different) period of time.

The results of comparing workload models (or their respective frequent patterns) may be used to deduce the profile of application users. For example, comparing (1) frequent patterns detected in a workload that occurred during morning hours with (2) frequent patterns detected in a workload that occurred during afternoon hours may indicate that customers browse more in the morning and purchase more in the afternoon. This information may help a merchant in determining, for example, where or when to present advertisements.

The results of comparing workload models may be used to detect errors, regressions, or security issues. For example, a first workload model is generated for an original workload that occurred while a first version of an application was executing (or "live"). Later, a new version of the application is deployed and a second workload is captured while the new version is "live". A second workload model is generated for the second workload. The first workload model and the second workload model are compared. Based on the comparison, it is determined that a pattern that existed in the first workload model does not appear as a pattern in the second workload model. Such a disappearance may indicate that a link or URL is missing in the new version of the application or that end-users cannot execute the corresponding code anymore. For example, users traverse a set of pages that are part of a once frequent pattern but something is broken (such as a missing link), which makes the completion of the once frequent pattern impossible.

As another example, a pattern reflected in the first workload model is associated with a first average time and the pattern reflected in the second workload model is associated with a second average time that is significantly longer (e.g., 2x) than the first average time. Such a situation may indicate a bug or problem in the code of the new version of the application.

As another example, one or more new patterns that are reflected in the second workload model but not in the first workload model may indicate that malicious code might be running in the background (regardless of whether the second workload model is based on a new version of an application or the same version of the application).

Thus, a comparison of workload models or their respective frequent patterns may indicate that a serious error has occurred. In response to a significant difference between two workload models, an alert may be generated automatically. An alert may involve sending an instant message, an email, or a text message, displaying a graphic on a screen of a computing device, playing pre-recorded audio or video.

Online Comparisons

In an embodiment, a workload model is built "online", i.e., while the corresponding workload is being captured. For example, a workload model is continuously being updated with additional captured workload. But before the workload model is updated, a workload model for the new captured information (that is not yet reflected in the workload model) is generated to determine frequent patterns. If one or more frequent patterns in the new workload model are significantly different than one or more frequent patterns in the larger "main" workload, then an alert is generated. Rapid changes in workload reflect an abnormality that may be associated with, for example, an updated application or malicious code. By analyzing a workload model in an online fashion, appropriate alerts may be generated promptly before extensive damage or harm occurs.

Application Tuning Advisor

In an embodiment, a workload model is analyzed to determine how an application that submits requests to a database server may be improved or "tuned." The component that provides suggestions for tuning an application is referred to herein as the "AppTuner." AppTuner may be implemented in software, hardware, or a combination of software and hardware. Input to AppTuner is one or more template patterns or a workload model rather than a set of one or more SQL statements. After analyzing template patterns or a workload model, the AppTuner suggests one or more changes that will (or might) result in improved performance, such as in execution time or amount of computer resources utilized. Additionally or alternatively, the AppTuner checks for error prone code that might result in producing incorrect output.

Figure 4:
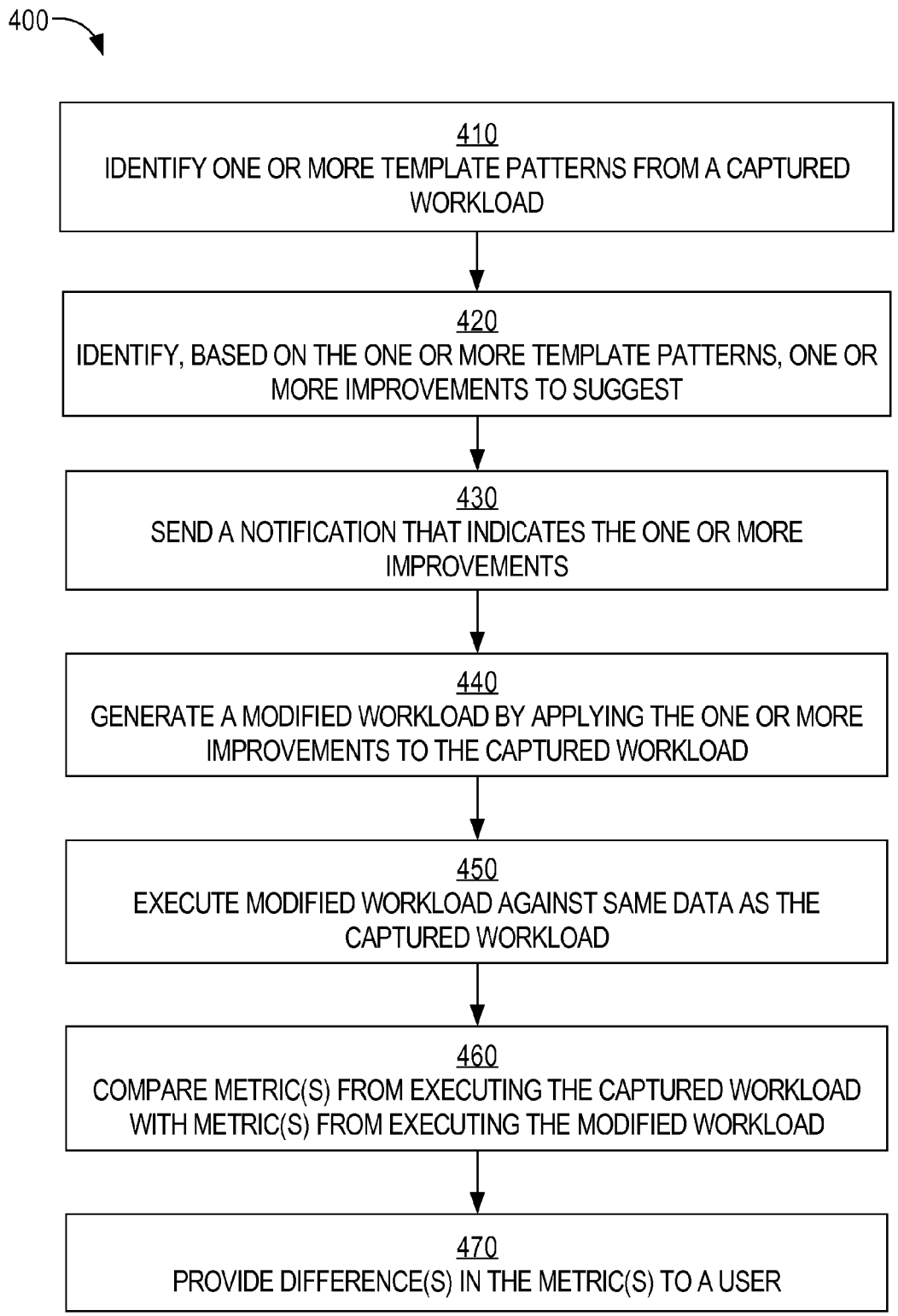
FIG. 4 is a flow diagram that depicts a process for using tuning an application based on a frequent template pattern, in an embodiment.

AppTuner may work with other components (e.g., DB replay that replays a workload or a modified workload) to help end-users or database administrators to assess performance improvement without having to change the application that submits requests to a database server. FIG. 4 is a flow diagram that depicts a process 400 for using the AppTuner, in an embodiment.

At block 410, a captured workload is analyzed to identify one or more template patterns. The captured workload includes information about server requests submitted by an application to a database server.

At block 420, the AppTuner analyzes the one or more template patterns to identify one or more improvements to suggest to a developer of the application.

For example, the AppTuner determines whether two or more templates in the frequent pattern can be combined into a single request. If multiple server requests in the captured workload can be combined into a single server request, then significant time savings or less computer resource utilization may be realized.

Alternatively, instead of analyzing frequent patterns in a captured workload, a workload model may be generated based on the captured workload, where the model comprises nodes and edges. The model may reflect multiple inserts into the same table. Replacing the individual inserts with a single bulk insert may result in significant time savings.

In an embodiment, AppTuner is not limited to analyzing template patterns or workload models based on server requests submitted by an application to a database server. AppTuner may additionally or alternatively be configured to analyze one or more template patterns generated from a database call workload that includes information about requests submitted by a database server in response to receiving server requests from an application. Examples of database calls are PREPARE (which causes an execution plan to be generated), EXECUTE (which causes the execution plan to be executed), and FETCH (which causes one or more data items to be retrieved from a chunk of data that was read into memory based on an EXECUTE call). One of the patterns may involve hundreds of FETCH calls for individual rows or data items. It is determined that the hundreds of FETCH calls may be replaced with few "large" FETCH calls, each of which is for multiple rows or data items. The identified pattern may be then correlated with multiple database server requests (e.g., SQL statements) received from an application. It is determined that the correlated database server requests may be replaced by a different set of database server requests to result in few FETCH calls and, thus, faster execution.

Examples of suggestions that the AppTuner may identify include the following:

Replacing Literals in SQL statements with bind variables

Grouping SQL statements
  a. E.g., "select name from emp" and "select age from emp" can be combined into one SQL statement as "select name, age from emp." This is very useful particularly with application servers that issue a relatively large number of unnecessary SQL statements.

Grouping SQL statements that are executed multiple times into a stored procedure (if possible)

An insert or update statement and an immediate select statement to find the row identifier or any other columns of a recently inserted or updated row in a table can be grouped to add the select in a returning clause.

Prepare/cursor/result cache; the AppTuner can suggest an optimal size for each of these three caches after analyzing a workload.

Pinning some database structures in volatile memory. As object dependencies can be extracted from the capture data, the most accessed objects across the sessions may be discovered, and those objects can be pinned in memory to avoid a buffer cache manager flushing those objects to (slower) non-volatile memory, such as a magnetic disk.

Determine whether there is client-side array (that is used to bind multiple values) and, if one exists, determine whether the size of the client-side array is reasonable for the real workload and suggest a new value. The same applies to LOB (large objects) handling and the LOB prefetch size.

Minimize the locking duration from the application. Sometimes, applications obtain a table lock (lock table or begin transaction) way ahead of when the table lock is required. Such situations may be identified and suggestions about shortening when the table lock is obtained may be provided.

Based on the data being inserted/updated into a table, table organization tuning parameters may be correctly suggested. Examples of create table parameters include PCTFREE (which is used to specify how much free space should be left in a database block for future updates) and PCTUSED (which is used to specify when a database block is empty enough (e.g., 40% unused) to be added to a list of "free" or available database blocks). If there are many updates to a table, then the AppTuner may increase the value of PCTFREE to avoid frequent row movement. Also, based on an access pattern of a table, the AppTuner may suggest storage clause parameters, such as the size of a buffer pool cache. Similar suggestions may be made for a tablespace for one or more LOBs. Such a suggestion may be the size of data blocks in the tablespace.

A reasonable result cache for queries that are being run without many changes in dependent objects may be suggested. For example, if "SELECT emp_name FROM employee" is being submitted many times, resulting in many fetches, then the AppTuner may suggest a larger result set cache on the server side that stores the results in the result set cache in order to avoid retrieving data from the database each time. The AppTuner may also determine whether any changes were made to depending objects. If so, the results cache should be invalidated. In the above example, the results cache may be reused until there are not more DML transactions that target the 'employee' table. If there was an insert into the employee table, then the result cache should be invalidated since the result cache does not contain the new row that was inserted. In summary, the AppTuner may suggest when to increase the result set cache based on the cache's usefulness.

Many times, application developers have little to no understanding as to how a typical database feature is to be used. The poor practices may be identified.

The user of autonomous transactions may be suggested, where necessary. An autonomous transaction is an independent transaction that is initiated by another transaction and executes without interfering with the parent transaction. When an autonomous transaction is called, the originating transaction becomes suspended. Control is returned when the autonomous transaction does a COMMIT or ROLLBACK. Application developers who do not have knowledge of autonomous transactions typically create multiple transactions. Thus, the AppTuner can suggest autonomous transactions where appropriate.

Determine whether there is a data type mismatch between a data type in a WHERE clause and a corresponding data type in a table definition. Such a mismatch can cause serious performance problems due to implicit/explicit cast during the filtering of rows.

Identify if the same sequence is being used in many places making the sequence a source of contention. A sequence is an object that is used to generate incrementing or decrementing numbers. Multiple sessions may be using the same sequence as part of an insert into a table as a primary key or as part of a select of the next value in the sequence. In both cases, the sequence is a source of contention. The AppTuner may identify this contention and identify the problematic sequence. Sometimes, a better sequence cache would be appropriate, which would help reduce contention. Thus, the AppTuner may suggest a sequence cache size where appropriate. A database server may cache the sequence numbers and update the sequence only when the sequence cache is full.

At block 430, the AppTuner sends a notification that certain changes may be made in the application in order to increase efficiency. The notification may be through manual means (e.g., a telephone call) or automatic means, such as generating and transmitting an email or text message. The notification may be sent to a database administrator or a developer of the application.

To persuade the application developer to make the change, it may be helpful to show evidence of the increased efficiency. Thus, at block 440, the suggested changes are made to the captured workload. Block 440 may be performed by the AppTuner, by another software/hardware component that is in communication with the AppTuner, or manually.

Block 440 involves generating a modified version of the original captured workload. Generating the modified version may be based on a modified workload model, where the modified version reflects the change(s) in server requests if the application that generated the server requests is changed.

At block 450, the modified workload is then executed against the same data as the original captured workload. Different metrics that reflect differences in the execution of the original workload and the execution of the modified version of the original workload are generated. Example metrics include total execution time, average or median CPU utilization, average or median memory utilization, and average or median network utilization.

At block 460, one or more metrics generated during (or after) execution of the modified workload are compared to one or more metrics generated during (or after) execution of the original captured workload.

At block 470, the differences in metrics are provided to a user, whether a database administrator or the application developer or both. By viewing the metrics that show improvement in execution, the application developer may appreciate the effect of the suggestion on a given workload and evaluate whether the suggestion is worth implementing.

Another aspect to improving performance involves error identification and removal. Analyzing a workload model may reveal patterns that tend to result in errors. For example, a node in a workload model may be associated with error information, which may be reflected in the workload model or in one or more capture files upon which the workload model is at least partially based. The node may be part of a pattern that occurs relatively frequently. Once the node is identified, the corresponding pattern is analyzed to determine a cause or source of the error. Once the cause or source of the error is identified and a correction is determined, the correction may be provided as a suggestion to an application developer to allow the application developer to implement the correction, which may result in fewer errors.

In an embodiment, the AppTuner is implemented as a rule-based engine. Rules may be represented in XML or JSON (JavaScript Object Notation). The AppTuner may consider each rule for each template pattern detected in a captured workload and determine whether an improvement may be made. The following is an example rule that considers all the SQL statements between two commits and attempts to convert the SQL statements into a single PL/SQL block.

```
<APP_TUNER_RULE>
    <NAME = "CONV_TXN_PLSQL">
    <INPUT = "MULTI_SQL"/>
    <OUTPUT= "PL/SQL"/>
    <FILTER TYPE= "IGNORE">
        <MODULE = "ABC" />
        <ACTION = "ORDERS"/>
    </FILTER>
    <STARTING_SQL>
        <CALL_TYPE = "COMMIT" />
    </STARTING_SQL>
    <ENDING_SQL>
        <CALL_TYPE = "COMMIT" />
    </ENDING_SQL>
    <HANDLER value = "convert_sql_to_plsql">
</APP_TUNER_RULE>
```

Evaluating Artificial Loads

A customer that uses a database server may execute their own or a third party (relative to the vendor of the database server) application that submits database server requests to the database server. It may be desirable to convince the customer to use a new version of the application or a different application altogether, such as one that is provided by the same vendor of the database server. To help persuade the customer, two different workloads are compared to each other: an actual workload captured at the user level (e.g., HTTP requests) and an artificial workload at the user level.

In an embodiment, an artificial workload is created based on a request mapping of a first set of requests to a second set of requests. The first set of requests are user requests found in a captured user workload associated with a first application. The second set of request are user requests that the new version of the application or a different application (or "second" application) would process. The request mapping is generated based on an understanding of the second application. For example, the first application may require a user to enter credit card information on one web page and then enter mailing address information on another webpage. The second application may prompt a user to enter both credit card information and mailing address information on the same page. Thus, in the request mapping for the second application, two requests may map to a single request.

For example, templates generated for a captured user workload include A, B, C, D, and E. A request mapping may map: (1) A to a, f; (2) B to b; (3) C, D to c; and (4) E to e. To create an artificial workload based on a workload model for the captured workload, a random "walk" of the workload model is performed. During the random walk, whenever a node corresponding to template A is traversed, templates for a and f are copied; whenever a node corresponding to template B is traversed, a template for b is copied; and so forth.

After the random walk, a series of templates corresponding to the new application is created. The series of templates are converted into well-formed user requests and artificial data is added to the well-formed user requests to create an artificial workload that corresponds to the second application.

Execution of the artificial workload by the second application results in one or more statistics that may reveal that executing the artificial workload is faster or requires fewer computer resources than executing the originally-captured user workload. Based on this information, the customer may decide to use the second application (or new version of the application).

In an embodiment, instead of generating an artificial workload, a model for the artificial workload (or "first artificial workload model") is generated based on the model for the captured workload and the request mapping. For example, templates in the captured workload model are translated to corresponding templates based on the mapping. The first artificial workload model is then compared against a second model that is generated (empirically) for another artificial workload that is generated using another software tool, such as LoadRunner. The comparison may reveal how realistic the first artificial workload is.

Additional Embodiments

In an embodiment, a first particular computer-implemented method comprises: generating a plurality of templates based on a plurality of requests that are indicated in a captured workload, wherein each template of the plurality of templates is a normalized version of a request of the plurality of requests; generating, based on the plurality of templates, a model for the captured workload, wherein generating the model comprises, for each template of the plurality of templates: generating a node that represents said each template; generating an edge that represents a transition from said each template to another template of the plurality of templates; determining a probability of transitioning from the node to a second node that represents said other template; associating the probability with the edge; generating, based on the model for the captured workload, an artificial workload by traversing a plurality of nodes in the model.

In an embodiment, the first particular method further comprises receiving input that indicates a scale factor, wherein generating the artificial workload is based on the scale factor, wherein the size of the artificial workload divided by the size of the workload is approximately the scale factor.

In an embodiment, the first particular method further comprises: receiving input that indicates one or more edit operations that are to be applied to the model; and in response to receiving the input, performing the one or more operations on the model, wherein the one or more operations include at least one of removing a particular node from the model, adding a certain node to the model, or changing a probability associated with a transition in the model.

In an embodiment, a second particular computer-implemented method comprises: generating results of processing a request; determining whether to store the results in a cache, wherein determining whether to store the results in the cache comprises: based on the request, identifying a first node in a model that represents a captured workload of multiple requests; based on the first node, identifying one or more other nodes in the model; identifying a first template that corresponds to the first node; for each of the one or more other nodes, identifying a second template; based on a comparison between the first template and the second template, determining whether to store the results in the cache.

In an embodiment, in the second particular method, identifying the one or more other nodes in the model comprises: determining one or more probabilities of transitioning, from the first node, to each of the one or more other nodes; and identifying the one or more other nodes based on the one or more probabilities.

In an embodiment, the second particular method further comprises normalizing the request to generate the first template, wherein identifying the first node comprises identifying the first node based on the first template.

In an embodiment, a third particular computer-implemented method comprises: storing a model that represents a captured workload of multiple requests, wherein the model includes a plurality of nodes, each of which (1) corresponds to a template that represents one or more requests in the multiple requests and (2) is connected to at least one other node in the plurality of nodes, wherein the captured workload originated from a first application; storing a mapping that maps, for each template associated with the model, said each template with one or more different templates of a plurality of different templates, wherein the plurality of different templates correspond to requests that a second application, that is different than the first application, is configured to generate; while traversing the model, using the mapping to translate templates that correspond nodes in the model to templates from the plurality of different templates.

In an embodiment, in the third particular method: using the mapping comprises maintaining a list of templates from the plurality of different templates; and the third particular method further comprises generating an artificial workload based on the list of templates.

In an embodiment, the previous embodiment that comprises generating the artificial workload further comprises: executing the artificial workload and generating one or more statistics about the execution; and comparing the one or more statistics with one or more statistics about execution of the captured workload.

In an embodiment, in the third particular method, using the mapping comprises generating a second model that represents an artificial workload that is different than the captured workload.

In an embodiment, a fourth particular computer-implemented method comprises: capturing a first workload of a first plurality of requests; normalizing the first plurality of requests to generate a first plurality of templates; identifying a first set of one or more template patterns from the first plurality of templates; capturing a second workload of a second plurality of requests that are different than the first plurality of requests; normalizing the second plurality of requests to generate a second plurality of templates; identifying a second set of one or more template patterns from the second plurality of templates; performing a comparison of the first set of one or more template patterns with the second set of one or more template patterns; based on the comparison, determining that one or more errors may have occurred between processing the first plurality of requests and processing the second plurality of requests; and generating an alert that indicates the one or more errors.

In an embodiment, a fifth particular computer-implemented method comprises: identifying a template pattern of requests indicated in a captured workload; and analyzing the template pattern to determine one or more suggestions that, if implemented by an application that submitted the requests, may improve performance of a database server that processes the requests.

In an embodiment, the fifth particular method further comprises: generating a plurality of templates based on a plurality of requests that are indicated in the captured workload, wherein each template of the plurality of templates is a normalized version of a request of the plurality of requests; based on the plurality of templates, and identifying one or more template patterns, each of which includes multiple templates, wherein identifying the template pattern comprises identifying the template pattern from the one or more template patterns.

In an embodiment, the fifth particular method further comprises: generated a modified workload based on the captured workload and the one or more suggestions; causing the modified workload to be executed against a database; generating one or more metrics as a result of causing the modified workload to be executed against the database; and comparing the one or more metrics with one or more initial metrics that were generated for the captured workload.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
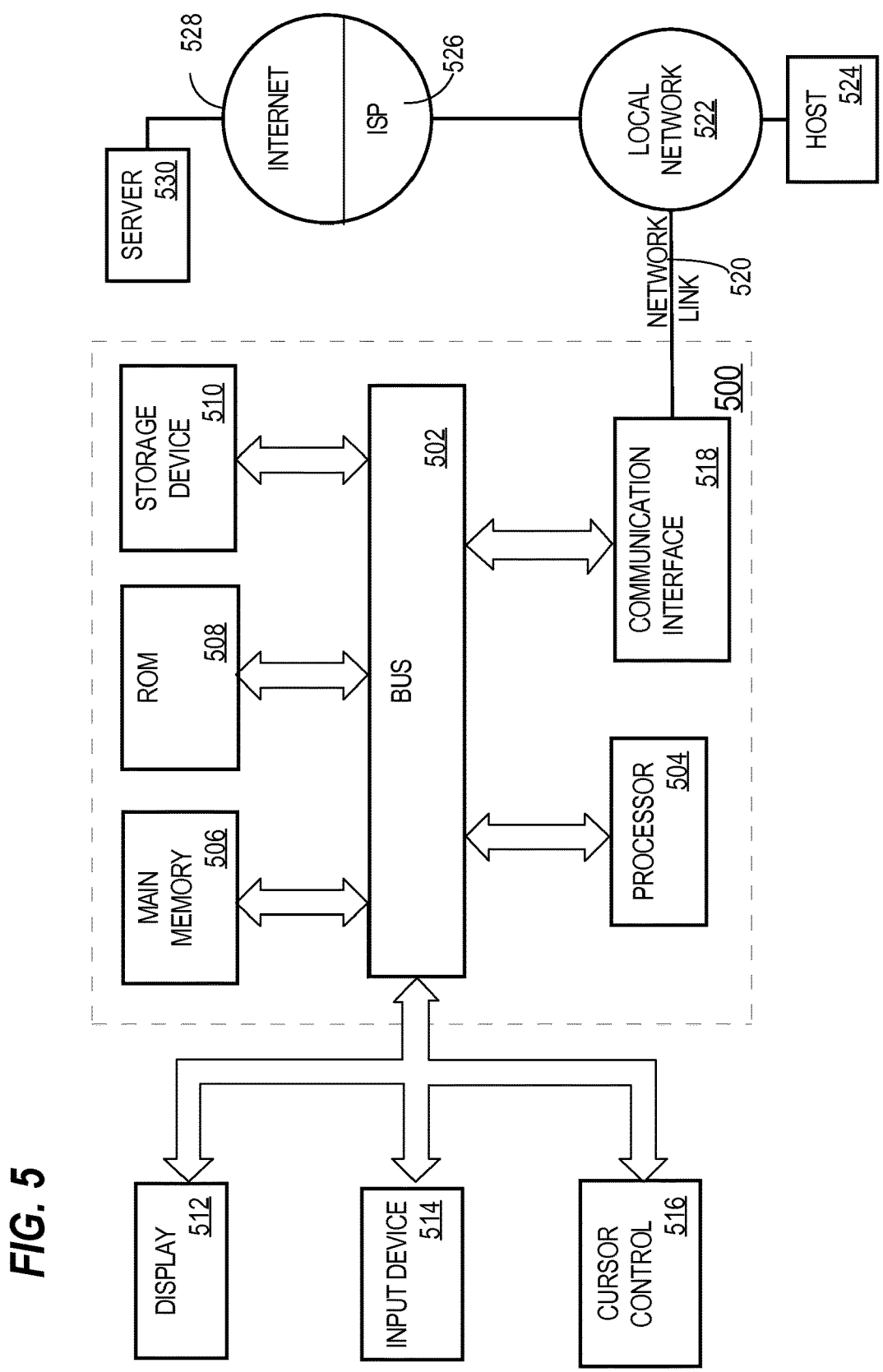
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid-crystal display (LCD) or a light-emitting diode (LED) display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In an embodiment, the one or more special-purpose computing devices upon which the techniques described herein are implemented are supported by on one or more storage solutions, examples of which include solid-state drives (SSDs) and cloud storage services, such as Amazon Web Services (AWS). AWS operates under a pay-for-what-you-use-as-you-use-it model while other cloud storage services may operate under a fixed subscription model.

In an embodiment, the techniques described herein are implemented using one or more processing solutions, examples of which include distributed systems, clustered computing systems, and cloud processing services, such as AWS that operates under a pay-for-what-you-use-as-you-use-it model or another processing service that operates under a fixed subscription model.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   in response to receiving a first request, identifying a first node in a model that represents a plurality of ordered template patterns followed by multiple previous requests, wherein the first node corresponds to a first template that represents a normalized version of the first request and one or more other requests, wherein the first request is mapped to the first template by removing one or more data values from the first request;
   determining a predicted template pattern based on a probability of transitioning from the first node to one or more other nodes of a plurality of other nodes in the model, wherein the predicted template pattern is a particular ordered template pattern, of the plurality of ordered template patterns, that includes the first template and one or more other templates;
   selecting a candidate node from the plurality of other nodes based on the predicted template pattern;
   identifying a second template that corresponds to the candidate node, wherein the second template represents a normalized version of at least a second request, wherein the second request maps to the second template by removing one or more data values from the second request;
   comparing the first template with at least the second template to determine an estimated cost for completing the first request and one or more other requests that follow the predicted template pattern;
   generating an execution plan for the first request, wherein the execution plan is generated based on both the estimated cost for completing the first request and the one or more other requests that follow the predicted template pattern.

2. The method of claim 1, wherein generating the execution plan for the first request comprises including, in the execution plan based on the predicted template pattern, an index to process the first request.

3. The method of claim 1, wherein generating the execution plan for the first request comprises including, in the execution plan based on the predicted template pattern, an operation to scan a table to process the first request instead of using an index on the table.

4. The method of claim 1, further comprising generating the model based on a frequency of patterns detected within the multiple requests.

5. The method of claim 1, wherein the execution plan is further generated based on a similarity between the first template and the second template.

6. The method of claim 5, wherein the similarity is determined based on data accessed for the first template and data accessed for the second template.

7. The method of claim 5, wherein the similarity is determined based on at least one sub-query associated with the first template and the second template.

8. The method of claim 1, wherein the probability of transitioning from the first node to one or more other nodes of a plurality of other nodes in the model is determined based on a sequence of requests that includes the first request and at least one request received previous to the first request.

9. The method of claim 1, wherein generating the execution plan includes selecting a first operator that is optimized for the predicted template pattern; wherein the first operator is selected instead of a second operator that is optimized for completing the first request.

10. One or more non-transitory storage media storing instructions which, when executed by one or more processors, cause:
   in response to receiving a first request, identifying a first node in a model that represents a plurality of ordered template patterns followed by multiple previous requests, wherein the first node corresponds to a first template that represents a normalized version of the first request and one or more other requests, wherein the first request is mapped to the first template by removing one or more data values from the first request;
   determining a predicted template pattern based on a probability of transitioning from the first node to one or more other nodes of a plurality of other nodes in the model, wherein the predicted template pattern is a particular ordered template pattern, of the plurality of ordered template patterns, that includes the first template and one or more other templates;
   selecting a candidate node from the plurality of other nodes based on the predicted template pattern;
   identifying a second template that corresponds to the candidate node, wherein the second template represents a normalized version of at least a second request, wherein the second request maps to the second template by removing one or more data values from the second request;
   comparing the first template with at least the second template to determine an estimated cost for completing the first request and one or more other requests that follow the predicted template pattern;
   generating an execution plan for the first request, wherein the execution plan is generated based on both the estimated cost for completing the first request and the one or more other requests that follow the predicted template pattern.

11. The one or more non-transitory storage media of claim 10, wherein generating the execution plan for the first request comprises including, in the execution plan based on the predicted template pattern, an index to process the first request.

12. The one or more non-transitory storage media of claim 10, wherein generating the execution plan for the first request comprises including, in the execution plan based on the predicted template pattern, an operation to scan a table to process the first request instead of using an index on the table.

13. The one or more non-transitory storage media of claim 10, wherein the instructions, when executed, further cause generating the model based on a frequency of patterns detected within the multiple requests.

14. The one or more non-transitory storage media of claim 10, wherein the execution plan is further generated based on a similarity between the first template and the second template.

15. The one or more non-transitory storage media of claim 14, wherein the similarity is determined based on data accessed for the first template and data accessed for the second template.

16. The one or more non-transitory storage media of claim 14, wherein the similarity is determined based on at least one sub-query associated with the first template and the second template.

17. The one or more non-transitory storage media of claim 10, wherein the probability of transitioning from the first node to one or more other nodes of a plurality of other nodes in the model is determined based on a sequence of requests that includes the first request and at least one request received previous to the first request.

18. The one or more non-transitory storage media of claim 10, wherein generating the execution plan includes selecting a first operator that is optimized for the predicted template pattern; wherein the first operator is selected instead of a second operator that is optimized for completing the first request.

19. A system comprising:
one or more hardware processors;
one or more non-transitory computer-readable media storing instructions which, when executed by the one or more hardware processors, cause operations comprising:

in response to receiving a first request, identifying a first node in a model that represents a plurality of ordered template patterns followed by multiple previous requests, wherein the first node corresponds to a first template that represents a normalized version of the first request and one or more other requests, wherein the first request is mapped to the first template by removing one or more data values from the first request;

determining a predicted template pattern based on a probability of transitioning from the first node to one or more other nodes of a plurality of other nodes in the model, wherein the predicted template pattern is a particular ordered template pattern, of the plurality of ordered template patterns, that includes the first template and one or more other templates;

selecting a candidate node from the plurality of other nodes based on the predicted template pattern;

identifying a second template that corresponds to the candidate node, wherein the second template represents a normalized version of at least a second request, wherein the second request maps to the second template by removing one or more data values from the second request;

comparing the first template with at least the second template to determine an estimated cost for completing the first request and one or more other requests that follow the predicted template pattern;

generating an execution plan for the first request, wherein the execution plan is generated based on both the estimated cost for completing the first request and the one or more other requests that follow the predicted template pattern.

20. The system of claim 19, wherein generating the execution plan for the first request comprises including, in the execution plan based on the predicted template pattern, an index to process the first request.

* * * * *